US010728179B2

(12) United States Patent
Baphna et al.

(10) Patent No.: US 10,728,179 B2
(45) Date of Patent: Jul. 28, 2020

(54) DISTRIBUTED VIRTUAL SWITCH CONFIGURATION AND STATE MANAGEMENT

(71) Applicant: VMware, Inc., Palo Alto, CA (US)

(72) Inventors: Mukesh Baphna, Fremont, CA (US); Chi-Hsiang Su, Santa Clara, CA (US); Piyush Kothari, Palo Alto, CA (US); Geetha Kakarlapudi, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 609 days.

(21) Appl. No.: 14/971,749

(22) Filed: Dec. 16, 2015

(65) Prior Publication Data

US 2016/0105381 A1   Apr. 14, 2016

Related U.S. Application Data

(62) Division of application No. 13/544,703, filed on Jul. 9, 2012, now Pat. No. 9,231,892.

(51) Int. Cl.
*H04L 12/931* (2013.01)
*H04L 12/46* (2006.01)
*H04L 12/24* (2006.01)
*H04L 12/935* (2013.01)

(52) U.S. Cl.
CPC .......... *H04L 49/70* (2013.01); *H04L 12/4641* (2013.01); *H04L 41/0816* (2013.01); *H04L 49/30* (2013.01)

(58) Field of Classification Search
CPC ............................... G06F 15/177; G06F 9/455
USPC ............................................................ 718/1
See application file for complete search history.

(56) References Cited

U.S. PATENT DOCUMENTS

| 5,113,523 A * | 5/1992 | Colley .............. G06F 15/17343 712/12 |
| 5,504,921 A | 4/1996 | Dev et al. |
| 5,550,816 A | 8/1996 | Hardwick et al. |
| 5,557,747 A * | 9/1996 | Rogers ................... H04L 41/16 709/223 |
| 5,729,685 A | 3/1998 | Chatwani et al. |

(Continued)

FOREIGN PATENT DOCUMENTS

WO    2013/184846 A1   12/2013

OTHER PUBLICATIONS

Author Unknown, "Virtual Machine Backup Guide," Nov. 2007, pp. 1-78, VMware, Inc., Palo Alto, California.

*Primary Examiner* — Sm A Rahman
*Assistant Examiner* — Chen-Liang Huang
(74) *Attorney, Agent, or Firm* — Patterson + Sheridan, LLP

(57) ABSTRACT

Techniques are disclosed for pushing configuration changes of a distributed virtual switch from a management server to a plurality of host servers underlying the distributed virtual switch. The approach includes sending, in parallel, by the management server, a message to each of the plurality of host servers. The message specifies a final configuration state for one or more virtual ports emulated via virtualization layers of the host servers. The approach further includes determining, by each of the plurality of host servers, port state configuration changes to make to the virtual ports to achieve the final configuration state, and reconfiguring, by each of the plurality of host servers, their respective virtual ports, to match the final configuration state.

20 Claims, 7 Drawing Sheets

(56) References Cited

U.S. PATENT DOCUMENTS

| | | | |
|---|---|---|---|
| 5,751,967 A | 5/1998 | Raab et al. | |
| 5,796,936 A | 8/1998 | Watabe et al. | |
| 5,953,689 A * | 9/1999 | Hale | G06F 3/0605 |
| | | | 702/182 |
| 6,104,699 A | 8/2000 | Holender et al. | |
| 6,219,699 B1 | 4/2001 | McCloghrie et al. | |
| 6,421,711 B1 * | 7/2002 | Blumenau | G06F 3/0605 |
| | | | 709/213 |
| 6,512,745 B1 | 1/2003 | Abe et al. | |
| 6,539,432 B1 | 3/2003 | Taguchi et al. | |
| 6,680,934 B1 | 1/2004 | Cain | |
| 6,785,843 B1 | 8/2004 | McRae et al. | |
| 6,898,189 B1 * | 5/2005 | Di Benedetto | H04L 41/00 |
| | | | 370/217 |
| 6,941,487 B1 | 9/2005 | Balakrishnan et al. | |
| 6,963,585 B1 | 11/2005 | Le Pennec et al. | |
| 7,079,544 B2 | 7/2006 | Wakayama et al. | |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,286,490 B2 | 10/2007 | Saleh et al. | |
| 7,359,971 B2 | 4/2008 | Jorgensen | |
| 7,450,598 B2 | 11/2008 | Chen et al. | |
| 7,483,370 B1 | 1/2009 | Dayal et al. | |
| 7,606,260 B2 | 10/2009 | Oguchi et al. | |
| 7,649,851 B2 | 1/2010 | Takashige et al. | |
| 7,710,874 B2 | 5/2010 | Balakrishnan et al. | |
| 7,730,486 B2 | 6/2010 | Herington | |
| 7,792,987 B1 | 9/2010 | Vohra et al. | |
| 7,802,251 B2 | 9/2010 | Kitamura | |
| 7,818,452 B2 | 10/2010 | Matthews et al. | |
| 7,826,482 B1 | 11/2010 | Minei et al. | |
| 7,885,276 B1 | 2/2011 | Lin | |
| 7,912,955 B1 | 3/2011 | Machiraju et al. | |
| 7,921,197 B2 | 4/2011 | Soundararajan | |
| 7,925,850 B1 | 4/2011 | Waldspurger et al. | |
| 7,937,438 B1 | 5/2011 | Miller et al. | |
| 7,948,986 B1 | 5/2011 | Ghosh et al. | |
| 8,027,354 B1 | 9/2011 | Portolani et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,102,781 B2 | 1/2012 | Smith | |
| 8,166,201 B2 | 4/2012 | Richardson et al. | |
| 8,194,680 B1 | 6/2012 | Brandwine et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,312,129 B1 | 11/2012 | Miller et al. | |
| 8,456,984 B2 | 6/2013 | Ranganathan et al. | |
| 8,504,718 B2 | 8/2013 | Wang et al. | |
| 8,621,058 B2 | 12/2013 | Eswaran et al. | |
| 8,644,188 B1 | 2/2014 | Brandwine et al. | |
| 8,705,513 B2 | 4/2014 | Van Der Merwe et al. | |
| 9,231,892 B2 * | 1/2016 | Baphna | H04L 49/70 |
| 9,547,516 B2 | 1/2017 | Thakkar et al. | |
| 9,858,100 B2 | 1/2018 | Thakkar et al. | |
| 9,875,127 B2 | 1/2018 | Thakkar et al. | |
| 2003/0093481 A1 | 5/2003 | Mitchell et al. | |
| 2003/0120822 A1 | 6/2003 | Langrind et al. | |
| 2004/0047286 A1 | 3/2004 | Larsen et al. | |
| 2004/0073659 A1 | 4/2004 | Rajsic et al. | |
| 2004/0098505 A1 | 5/2004 | Clemmensen | |
| 2004/0267897 A1 | 12/2004 | Hill et al. | |
| 2005/0018669 A1 | 1/2005 | Arndt et al. | |
| 2005/0038834 A1 | 2/2005 | Souder et al. | |
| 2005/0083953 A1 | 4/2005 | May | |
| 2005/0120160 A1 | 6/2005 | Plouffe et al. | |
| 2006/0002370 A1 | 1/2006 | Rabie et al. | |
| 2006/0026225 A1 | 2/2006 | Canali et al. | |
| 2006/0092861 A1 | 5/2006 | Corday et al. | |
| 2006/0092940 A1 | 5/2006 | Ansari et al. | |
| 2006/0092976 A1 | 5/2006 | Lakshman et al. | |
| 2006/0174087 A1 | 8/2006 | Hashimoto et al. | |
| 2006/0184937 A1 | 8/2006 | Abels et al. | |
| 2006/0193266 A1 | 8/2006 | Siddha et al. | |
| 2007/0038866 A1 * | 2/2007 | Bardsley | H04L 63/0272 |
| | | | 713/182 |
| 2007/0043860 A1 | 2/2007 | Pabari | |
| 2007/0156919 A1 | 7/2007 | Potti et al. | |
| 2007/0220358 A1 | 9/2007 | Goodill et al. | |
| 2007/0260721 A1 | 11/2007 | Bose et al. | |
| 2007/0282951 A1 | 12/2007 | Selimis et al. | |
| 2007/0283348 A1 | 12/2007 | White | |
| 2007/0297428 A1 | 12/2007 | Bose et al. | |
| 2008/0002579 A1 | 1/2008 | Lindholm et al. | |
| 2008/0040467 A1 | 2/2008 | Mendiratta et al. | |
| 2008/0049621 A1 | 2/2008 | McGuire et al. | |
| 2008/0059556 A1 | 3/2008 | Greenspan et al. | |
| 2008/0060026 A1 * | 3/2008 | Cheung | H04L 41/28 |
| | | | 725/81 |
| 2008/0071900 A1 | 3/2008 | Hecker et al. | |
| 2008/0159301 A1 | 7/2008 | de Heer | |
| 2008/0165704 A1 | 7/2008 | Marchetti et al. | |
| 2008/0219268 A1 | 9/2008 | Dennison | |
| 2009/0109841 A1 * | 4/2009 | Nozaki | H04L 45/00 |
| | | | 370/218 |
| 2009/0292858 A1 * | 11/2009 | Lambeth | H04L 29/12839 |
| | | | 711/6 |
| 2009/0296726 A1 | 12/2009 | Snively et al. | |
| 2011/0103259 A1 | 5/2011 | Aybay et al. | |
| 2011/0211532 A1 | 9/2011 | Hargrave et al. | |
| 2011/0296052 A1 | 12/2011 | Guo et al. | |
| 2012/0072909 A1 | 3/2012 | Malik et al. | |
| 2012/0127854 A1 * | 5/2012 | Khetan | H04L 12/4641 |
| | | | 370/218 |
| 2012/0131662 A1 | 5/2012 | Kuik et al. | |
| 2012/0147894 A1 | 6/2012 | Mulligan et al. | |
| 2012/0179804 A1 * | 7/2012 | Katanp | G06F 13/4022 |
| | | | 709/223 |
| 2013/0024579 A1 | 1/2013 | Zhang et al. | |
| 2013/0060940 A1 | 3/2013 | Koponen et al. | |
| 2013/0121154 A1 * | 5/2013 | Guay | H04L 45/125 |
| | | | 370/236 |
| 2013/0332602 A1 | 12/2013 | Nakil et al. | |
| 2013/0332619 A1 | 12/2013 | Xie et al. | |
| 2013/0332982 A1 * | 12/2013 | Rao | H04L 63/08 |
| | | | 726/1 |

\* cited by examiner

DISTRIBUTED VIRTUAL SWITCH CONFIGURATION AND STATE MANAGEMENT

CROSS-REFERENCE TO RELATED APPLICATION(S)

This application is a division of U.S. patent application Ser. No. 13/544,703, filed on Jul. 9, 2012, the entire contents of which are incorporated herein by reference.

BACKGROUND

Computer virtualization is a technique that involves encapsulating a computing machine platform into a virtual machine (VM) that is executed under the control of virtualization software running on a single hardware computing platform (also referred to herein as "host server" or "host"). A group of hardware computing platforms may be organized as a cluster to provide resources for VMs. In a data center, it is common to see hundreds, even thousands, of VMs running on multiple clusters of host servers.

An administrator may use virtualization management software to manage virtual machine configurations and computing resource allocations. Because of the large number of VMs managed within some data centers, and sometimes, across multiple data centers, some of the administrator's tasks are automated. For example, software techniques, such as adaptive resource scheduling and adaptive power management, have been developed to assist the administrator in balancing workloads across host servers and powering host servers on and off as needed.

One feature of the virtualized computing environment controlled by the virtualization management software is virtual networking. VMs can be created with software-based virtual network adapters that are logically connected to physical network adapters installed in the host computer. The virtual network adapters are connected to the physical network adapters through software-based virtual switches. One way to manage virtual network connections in data centers with a large number of VMs running on multiple host servers (i.e., host servers) is via a "distributed virtual switch" (DVSwitch) described in US 2009/0292858, incorporated in its entirety herein by reference. DVSwitches permit users to manage virtual switches on multiple host servers as if the ports of those virtual switches belonged to a single switch. Further, DVSwitches persist port runtime states across host servers.

DVSwitches have components residing in both host servers hosting VMs and a management server running virtual management software. Communication between the host servers and the management server can become a bottleneck as the scale of the DVSwitch increases, either in terms of the number of virtual ports in the DVSwitch or in terms of the number of host servers that joined the DVSwitch. In particular, switch configuration changes in the DVSwitch management plane may need to be propagated to a large number of host servers, which impacts the latency of operations. The volume of port runtime data being transmitted between the large number of host servers and the management server and processed by the management server may also negatively affect the performance of the management server and/or the network. That is, increases in the number of host servers, and virtual ports, result in a proportionately large amount of port configuration and runtime state data that must be sent over the network from the management server to the host servers, and vice versa.

SUMMARY

The disclosure provides a technique for pushing in parallel configuration changes of a distributed virtual switch from a management server to a plurality of host servers underlying the distributed virtual switch. The technique includes sending, by the management server, a message to each of the plurality of host servers. The message specifies a final configuration state for one or more virtual ports emulated via virtualization layers of the host servers. The technique further includes determining, by each of the plurality of host servers, port state configuration changes to make to the virtual ports to achieve the final configuration state, and reconfiguring, by each of the plurality of host servers, their respective virtual ports, to match the final configuration state.

Further embodiments of the present invention include a computer-readable storage medium storing instructions that when executed by a computer system cause the computer system to perform one or more the of the techniques set forth above, and a computer system programmed to carry out one or more of the techniques set forth above.

DETAILED DESCRIPTION

Figure 1:
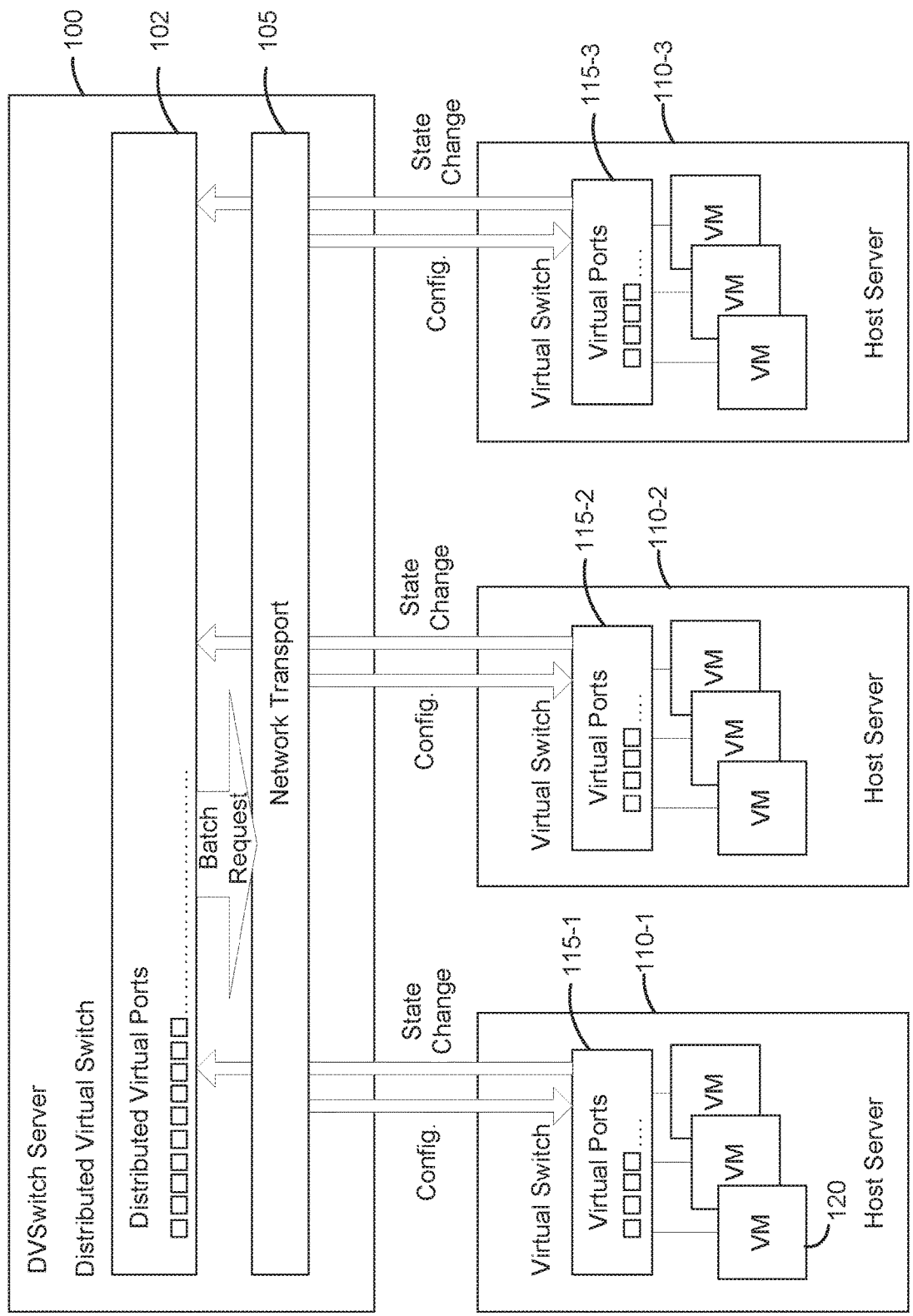
FIG. 1 depicts a system in which embodiments presented herein may be implemented.

Embodiments presented herein provide techniques for managing configuration and runtime state changes of a distributed virtual switch (DVSwitch). In one embodiment, a management server asynchronously pushes a final configuration state to a plurality of host servers, each of which then reconfigures its own virtual port states to match the final configuration state where appropriate. Doing so reduces resulting network traffic because only the final configuration state is sent. In addition, this approach relieves the management server from having to cache port state data for virtual ports of the plurality of host servers, because the management server instead sends the final configuration state and each host server determines, based on the final configuration state, what action(s) to take for virtual ports supported by the host server. Embodiments presented herein further provide techniques for host servers to push port runtime state data to the management server for persisting in a database of the management server. That is, the virtual switch on a given host notifies the management server about port state changes and port state runtime data.

In one embodiment, each host server includes a "clobber" API configured to accomplish state transition in a manner that is idempotent from the perspective of the management server. That is, the management server need only send a desired final state configuration by invoking the clobber API, and each host server can accomplish state transitions independent of the management server. Doing so relieves the management server from tracking the current state of each host server or having to perform change/delta computations before invoking state transitions on the host servers. Upon a successful state transition, the clobber API may make a callback notifying the management server of the success.

In a further embodiment, a management application asynchronously invokes clobber APIs on host servers. Specifically, the management application sends API invocations in batches to a network transport component. Because the API invocations are sent in batches and executed in parallel, the time required to transition multiple hosts is not linearly proportional to the number of invocations. Each API invocation may further lead to a "success," "fail," or "time out" error callback from the network transport component, the management application may wait for such callbacks in parallel and add an entry to a "re-push" queue for each timed-out and failed API invocation. Periodically, the management application may re-invoke each API that the re-push queue indicates as having previously timed out or failed.

In yet another embodiment, the host servers may push certain port runtime state data to the management server by sending port data when certain predefined events occur. That is, the host server may send port state change data for some port states only when a predefined port state change event occurs. Sending port data upon predefined events ensures that runtime data is communicated only after those events, thereby reducing the number of times and the amount of data being sent and processed. For other port states that change frequently, the host server may send state data only when the port state stops changing. Only sending port data when the port state stops changing also reduces the number of times and the amount of data being sent and processed.

Reference is now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

FIG. 1 depicts a system in which an embodiment is implemented. As shown, the system includes a distributed virtual switch (DVSwitch) server 100 and a plurality of host servers 110-1, 110-2, 110-3. As shown, DVSwitch server 100 includes a distributed virtual switch (DVSwitch) 102 and an asynchronous/parallel invocation network transport component 105. Distributed virtual switch 102 is a software abstraction of a physical switch with a plurality of distributed virtual ports (DVPorts) that captures the "personality" (i.e., the configuration and runtime states) of a corresponding virtual port on a host server 110. DVSwitch 102 resides on a variety of hardware, hence the term "distributed" virtual switch. As shown, DVSwitch 102 is managed via DVSwitch server 100. DVSwitch 102 may permit a variety of configuration options. For example, a user may assign virtual local area networks (VLANs), security profiles, and/or limit the amount of traffic that VMs can generate.

DVSwitch 102 simplifies provisioning and administrating virtual networking across many hosts and clusters though a centralized interface. That is, a user need not manage multiple individual and segregated virtual switches 115 on corresponding host servers 110-1, 110-2, 110-3 because switch configuration (e.g., VLAN configurations) and port runtime states can be managed across host servers via DVSwitch 102. Additionally, DVSwitch 102 may provide simplified end-to-end physical and virtual network management through third-party switch extensions, enhanced provisioning and traffic management capabilities through private VLAN support and bidirectional VM rate-limiting, enhanced security and monitoring for VM migrations, prioritized controls between different traffic types, and/or load-based dynamic adjustment across a team of physical adapters on the distributed virtual switch.

Network transport component 105 permits asynchronous and parallel invocation of APIs on DVSwitch server 100 and on the host servers 110-1, 110-2, 110-3. After a DVSwitch management application (not shown) running on DVSwitch sever 100 sends data to network transport component 105, control is returned immediately to the management application. Network transport component 105 may make a callback to the application (e.g., notifying the application that data was successfully delivered). Because API invocation via the networking transport is asynchronous, applications may send batch invocation requests to the network transport component. For example, a management application for DVSwitch 102 may send a switch configuration change as a batch request to network transport component 105, which then invokes APIs on each of a plurality of host servers 110-1, 110-2, 110-3 to accomplish the configuration change. Similarly, host servers 110-1, 110-2, 110-3 may asynchronously push port state runtime data to DVSwitch server 100 via network transport component 105.

As shown, each host server 110-1, 110-2, 110-3 includes a plurality of virtual machines (VMs) 120 and a virtual switch 115. Host servers 110-1, 110-2, 110-3 are configured to deliver virtualization-based distributed services to information technology environments. Each host server 110 provides a virtualization layer that abstracts processor, memory, storage, and/or networking resources into multiple VMs 120 that run side-by-side on the same host server 110. In one embodiment, virtualization software can be installed directly on the server hardware and inserts a virtualization layer between the hardware and the operating system. The virtualization software partitions a host server 110 into multiple secure and portable VMs 120 that run on the same host server. Thus, each VM 120 represents a complete system—with processors, memory, networking, storage, and/or BIOS.

Like the DVSwitch 102, each virtual switch 115 of host server 110 is a software abstraction of a physical switch and includes a plurality of virtual ports. Each virtual port may support a virtual network interface card (vNIC) instantiated in a virtualization layer supporting VMs 120. Each VM 120 may be logically connected to a virtual port on a virtual switch 115 which is, in turn, logically connected to a physical NIC (pNIC) (not shown) included in host server 110. Each pNIC is connected to one or more physical networks and communicates with other pNICs and the outside world via a router or a switch.

A user may use the DVSwitch 102 abstraction to manage a plurality of virtual switches 115 on one or more host servers 110. DVSwitch 102 includes DVPorts which are software abstractions capturing the configuration and runtime states of the virtual ports. In one aspect, each DVPort stores data structures representing the configuration and runtime state of a corresponding virtual port of a DVSwitch 102. As noted, DVSwitch 102 itself spans multiple virtual switches on host servers 110, thereby permitting a user to manage every virtual port of those virtual switches as though they were part of a larger virtual switch, namely DVSwitch 102.

Figure 2:
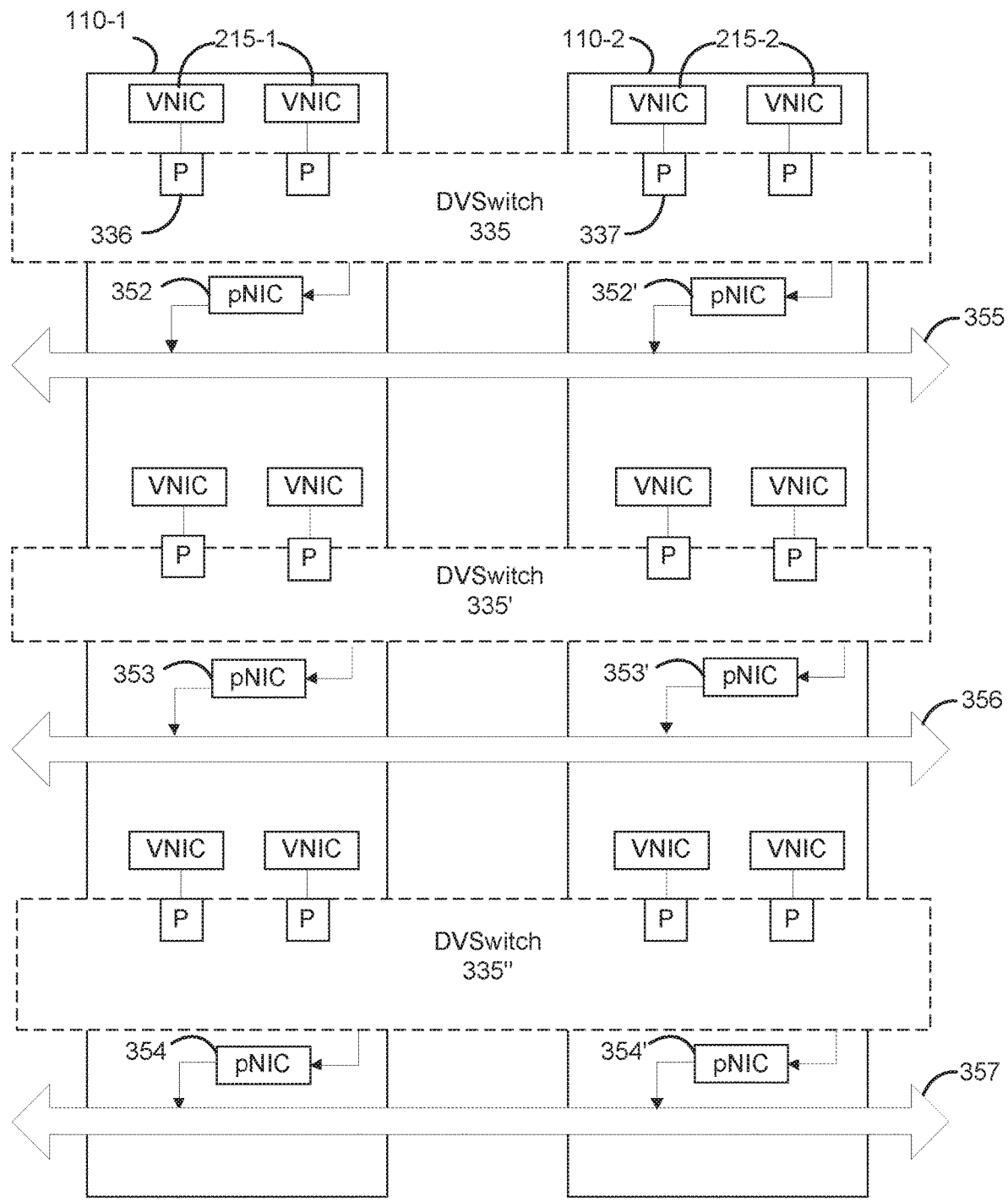
FIG. 2 depicts an example configuration of DVSwitches, according to an embodiment.

FIG. 2 depicts an example configuration of DVSwitches, according to an embodiment. As shown, a plurality of distributed virtual switches 335, 335', 335" each span a first and second host 110-1, 110-2. In this example, each VNIC is attached to one of DVSwitches 335, 335', 335", which are associated with corresponding pNICs for each host 110. Thus, VNICs 215-1, each of which may correspond to an individual VM, are associated with a DVPort, e.g., 336, 337, which are collectively managed via DVSwitch 335. DVSwitch 335 in turn provides connectivity for VNICs 215-1, 215-2 to network 355 via pNICs 352, 352'. From the user's perspective, specific knowledge of settings and state of individual virtual ports of virtual switches is unnecessary. In this way, the DVSwitch represents a convenient abstraction of underlying logic implementing links between VNICs and virtual switches. This approach also allows users (e.g., a network or host administrator) to manage the DVSwitch as an abstraction of a physical switch connecting each of the VMs to a particular local area network (LAN). Because the DVSwitch abstracts out the settings of individual virtual switches and virtual ports, the administrator only needs to concern himself or herself with attaching the DVSwitch to each VNIC. Once done, virtual ports and switches that back the DVPorts and DVSwitches may automatically be configured when restarting or suspending and resuming a VM, as discussed in greater detail below with respect to FIG. 3.

As suggested by FIG. 2, a single host 110-1 may interact with a plurality of DVSwitches, each associated with a corresponding network. In the present example, hosts 110-1, 110-2 each interact with DVSwitches 335, 335', 335", which in turn are connected to networks 355, 356, and 357, respectively. Host 110-1 includes pNIC 352 connecting DVSwitch 335 to network 355, pNIC 353 connecting DVSwitch 335' to network 356, and pNIC 354 connecting DVSwitch 335" to network 357. Host 110-2 includes corresponding components, although many other configurations are possible, as would be recognized by those skilled in the art.

Figure 3:
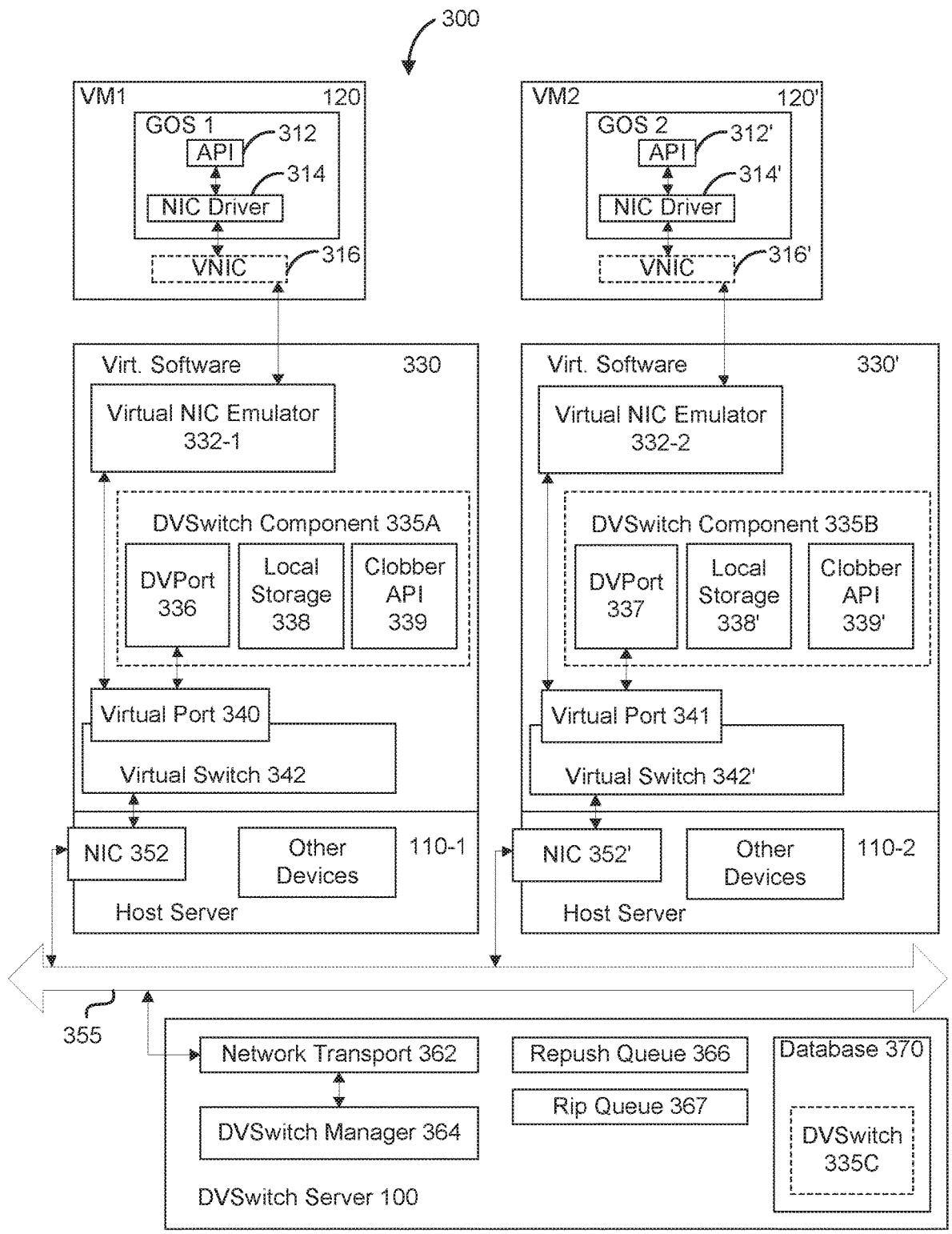
FIG. 3 depicts a collection of virtualized computer systems managed using a DVSwitch, according to an embodiment.

FIG. 3 depicts, by way of example, a managed collection 300 of virtualized computer systems that includes a DVSwitch, according to an embodiment. The DVSwitch comprises DVSwitch components 335A, 335B according to one embodiment. The DVSwitch is a software abstraction which binds virtual switches 342, 342' in the managed collection into a single logical configurable entity. FIG. 3 represents only two hosts 110-1, 110-2 each having only a single VM 120, 120' and corresponding VNIC emulators 332-1, 332-2, only for purpose of illustration. It should be recognized that a DVSwitch may span any number of hosts each having any number of VMs, which each have, in turn, any number of VNICs, any of which may be limited in number by available hardware resources of the individual hosts.

The DVSwitch, as a software abstraction, resides on a variety of hardware in a distributed manner, hence the term "distributed" virtual switch. For example, DVSwitch components 335A, 335B reside in hosts 110-1, 110-2 as well as DVSwitch server 100. DVSwitch components 335A, 335B are illustrated in FIG. 3 with a dotted line box indicating portions of DVSwitch 335A, 335B that make up the DVSwitch. In addition to these components, logic implementing DVSwitch functionality is located in virtualization software 330, 330' and DVSwitch manager 364 as described in more detail below.

As shown in FIG. 3, a virtual port 340, 341 is maintained for each VNIC 316, 316', respectively. Each VNIC emulator 332-1, 332-2 interacts with NIC drivers 314, 314' in VMs 120, 120' to send and receive data to and from VMs 120, 120'. For example, each VNIC emulator 332-1, 332-2 may maintain the state for one or more VNICs for each VM 120, 120'. Alternatively, multiple instances of VNIC emulators 332-1, 332-2 (only one shown for each host) may be instantiated within a virtualization software layer. In either case, a single VM may have one or more VNICs, which may be implemented by one or more VNIC emulators. For the purpose of illustration, FIG. 3 shows only one VNIC for each VM, and only one VM for each host. It should be recognized that discussion herein of VNICs 316, 316' is actually a discussion of a VNIC state implemented and maintained by each VNIC emulator 332-1, 332-2. As mentioned previously, virtual devices such as VNICS 316, 316' are software abstractions that are convenient to discuss as though part of VMs 120-1, 120-2, but are actually implemented by virtualization software 330, 330' using emulators 332-1, 332-2. The state of each VM 120-1, 120-2, however, includes the state of its virtual devices, which is controlled and maintained by the underlying virtualization software 330, 330'. When a VM is suspended or shut-down and migrated, its state, which includes network settings such as the MAC addresses of any VNICS, are migrated along with the VM.

Virtual switches 342, 342' that are connected to the same physical network 355 may be managed using one DVSwitch. Physical network 355, may be, e.g., a local area network. In FIG. 3, DVSwitch 335 includes distributed virtual ports (DVPorts) 336, 337. As described above with respect to FIG. 1, each DVPort is a software abstraction that encapsulates the "personality" (both configuration and runtime state) of a corresponding virtual port. For example, DVPort 336 may contain one or more data structures representing the configuration and runtime states of a virtual port 340 of a virtual switch 342 on host server 110-1. Each DVPort 336, 337 may be created with a configuration predefined by a network administrator. Virtual ports 340, 341 are created and start with a blank configuration state, but once associated with a DVPort, assume the configuration and runtime state of the associated DVPort. When a VM is migrated or powered off and on, the "connection" between a DVPort and a virtual NIC is not affected because the DVPort "persists" and migrates with the VM to which it is connected. For example, when a VM powers off or is suspended, the DVSwitch management application may release the underlying virtual port and resources used for the associated DVPort, but DVSwitch 335 does not release the DVPort to be used by another virtual NIC. Before releasing the virtual port, the system may synchronize all registered port state back to DVPort. When the VM powers on again or resumes, the DVPort may request a new virtual port on host and synchronize all the registered port state back to it.

The term "connection" is used herein to describe an association between a virtual NIC with a DVPort. In one embodiment, this association is maintained locally by virtualization software 330, 330' in a table or other data structure within database 370 as described in more detail below. When a connection to a DVPort is created, another virtual NIC cannot be connected to that same DVPort without explicitly disconnecting the already connected virtual NIC. Once the VM is powered on, the DVPort may be referred to as being in a "linked up" state, meaning the virtual NIC and a virtual port are ready to send and receive frames.

DVSwitch 335 and DVports 336, 337 are created from the physical resources available to physical NICs 352, 352' in the managed domain of hosts 110-1, 110-2. Once created, database 370 in DVSwitch server 100 stores the state of DVSwitch 335 and DVports 336, 337. Database 370 may be provided on DVSwitch manager 364, which is connected to hosts 110-1, 110-2 via physical network 355. For states that are global to a given DVSwitch 350, DVSwitch manager 364 pushes read-only copies to each of the hosts 110-1, 110-2 in the managed domain. States that are specific to a given DVport 336, 337, however, are needed by the host where the DVport's corresponding virtual port 340, 341 is located. Thus, the DVSwitch manager 364 may push the DVport state only to the necessary host.

In addition to being stored in database 370, some DVSwitch states may be cached on each host in the managed domain via local storage 338, 338'. For example, DVSwitch server 100 push relevant updates to each host's local storage 338, 338' in the managed domain. To push DVSwitch updates to host servers 110-1, 110-2, DVSwitch manager 364 may send an asynchronous batch request to a network transport component 362. In response, network transport component 362 may invoke in parallel "clobber" APIs 339, 339' on each of hosts 110-1, 110-2 indicated in the batch request. Clobber APIs 339, 339' are configured to accomplish state transitions in a manner that is idempotent. DVSwitch manager 364 may simply send, via network transport component 362, the desired final state configuration, and each clobber API independently determines how to achieve that final state configuration for the respective host server. Even if those hosts do not have inconsistent DVSwitch configuration state data, the idempotency of the clobber API ensures that further clobber API invocations are harmless. Such an approach relieves the DVSwitch manager 364 from having to cache the prior states of each host server and performing change/delta computations before invoking state transitions on host servers. Further, clobber APIs 339, 339' may return from invocation upon a successful state transition. Network transport component 362 may be configured to wait for such invocation return and make a callback to notify DVSwitch manager 364 of the completion of the invocation. DVSwitch manager 364 may add an entry to a "re-push" queue if the clobber API encounters an error or timeout. Similarly, for a request to "remove" an object, the DVSwitch manager 364 may add an entry to a "rip" queue 367 if the removal is unsuccessful. For example, where removal of a virtual port object from a host server fails, the DVSwitch manager 364 may add an entry to the rip queue 367 indicating the failure.

The phrase "local storage" should be interpreted broadly herein to reflect a data storage device or system that is readily accessible by the host servers. In one embodiment, hosts 110-1, 110-2 assume that local storage 338, 338' is up to date and that any updates they make to the local storage will be pushed back to database 370 in a timely manner. In such a case, hosts 110-1, 110-2 may push runtime port state changes to database 370 via one of two techniques. For runtime port states which change infrequently, hosts 110-1, 110-2 may monitor the port state and update database 370 when a port state change is detected. Such an approach eliminates the need for DVSwitch manager 364 to periodically poll local storage 338, 338' to determine whether the port state has changed. In contrast, for port runtime states which change frequently, such as port statistics counter states, hosts 110-1, 110-2 may monitor the port state and update database 370 only when the port state stops changing. That is, data pertaining to these port runtime states, which would often be stale in database 370 even if database 370 were updated periodically, is not sent to database 370 until the port state stops changing. While the port states continue changing, a user wishing to retrieve the current port runtime states may request DVSwitch manager 364 to directly poll local storage 338, 338' to retrieve data for the port runtime state.

Figure 4:
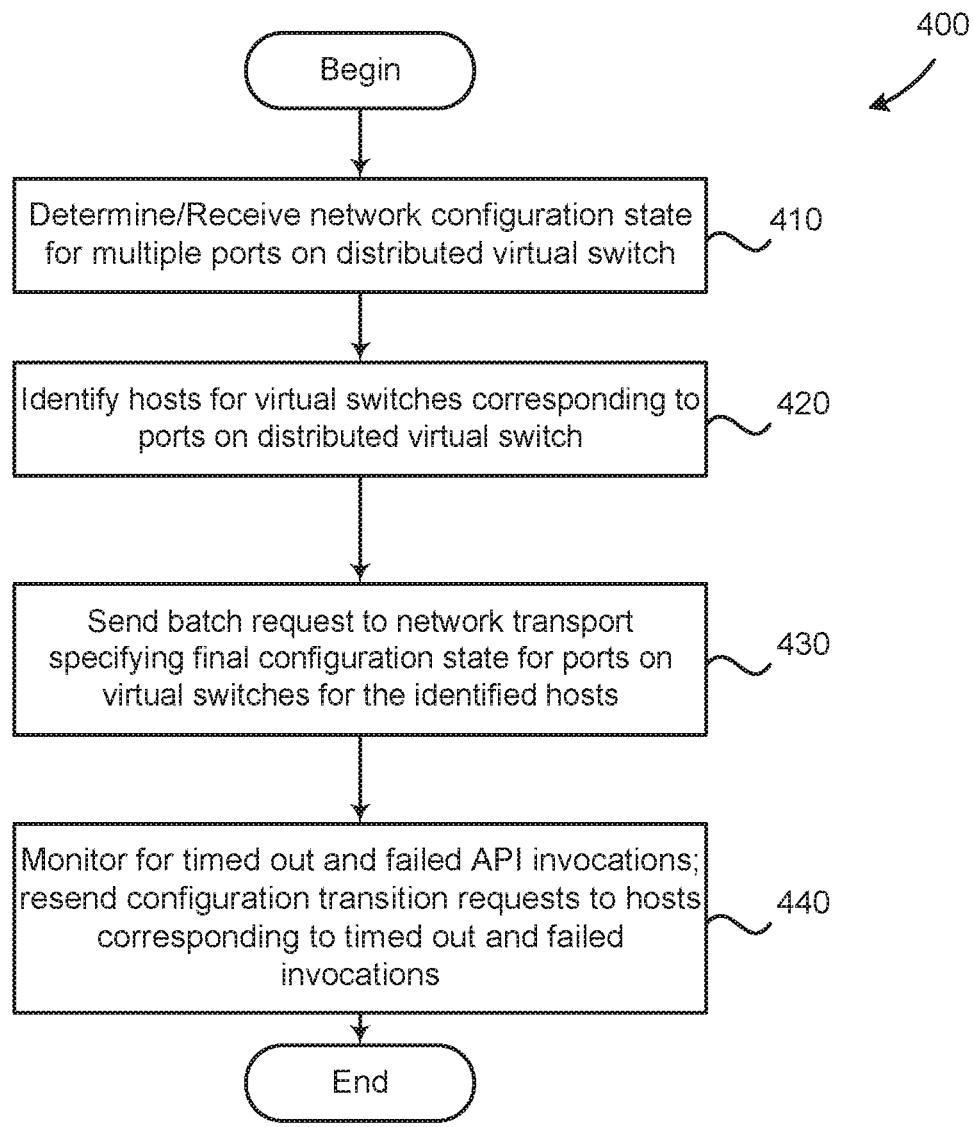
FIG. 4 illustrates a method for a DVSwitch management application to push switch configuration changes to host servers, according to an embodiment.

FIG. 4 illustrates a method for a DVSwitch management application to push switch configuration changes to host servers, according to an embodiment. Although the method steps are described in conjunction with FIGS. 1-3, persons skilled in the art will understand that any system configured to perform the method steps, in any order, falls within the scope of the present disclosure.

As shown, method 400 begins at step 410, where DVSwitch manager 364 determines (or receives) a network configuration state for multiple ports on DVSwitch 335. For example, a user may assign a VLAN or a security profile affecting multiple DVports 336, 337 of DVSwitch 335. DVSwitch server 100 stores data of such assignments in Database 370, and DVSwitch manager may push out such assignments to one or more of hosts 110-1, 110-2 whose virtualization layers support virtual ports associated with the DVports 336, 337. This ensures DVSwitch configuration data in database 370 remains consistent with configuration data in local storage 338, 338' of each host 110-1, 110-2.

At step 420, DVSwitch manager 364 identifies hosts 110-1, 110-2 having virtual switches with virtual ports corresponding to DVports 336, 337 on DVSwitch 335. For states that are global to DVSwitch 335, DVSwitch manager 364 may push read-only copies to each of hosts 110-1, 110-2 in the managed domain. For states that are specific to a given DVport 336, 337, however, the DVSwitch manager 364 may push updates only to the necessary host or hosts. In such cases, the DVSwitch manager 364 may identify those hosts 110-1, 110-2 having virtual switches supporting DVports to which the state change applies.

At step 430, DVSwitch manager 364 makes a send batch request to network transport component 362 specifying a target configuration state for ports on virtual switches for the identified hosts. To eliminate waiting times, network transport component 362 may be configured to receive asynchronous input/output (I/O) requests from DVSwitch manager 364, and network transport component 362 may further be configured to perform I/O operations to hosts 110-1, 110-2 in parallel. In particular, network transport component 362 may invoke clobber APIs 339, 339' on each of host servers 110-1, 110-2 in parallel and make a callback to DVSwitch manager 364 upon completion of the invocation of clobber APIs 339, 339'. For such parallel invocations, the time taken is not linearly proportional to the number of invocations, so virtual ports on a plurality of host servers can be updated faster than via non-parallel invocations.

In one embodiment, clobber API 339, 339' may perform state transition in a manner that is idempotent. In such a case, DVSwitch manager 364 may only send a desired final configuration state to hosts 110-1, 110-2 by invoking clobber API 339, 339'. Even if those hosts do not have inconsistent DVSwitch configuration state data, the idempotence of clobber API 339, 339' ensures that further clobber API 339, 339' invocations are harmless. Because DVSwitch manager 364 may only send a desired final state, DVSwitch manager 364 need not determine the change/delta for virtual ports on each of hosts' 110-1, 110-2 necessary to change the current configuration states of those virtual ports to the final configuration state. Further, DVSwitch server need not store (e.g., in database 370) current configuration states for virtual ports on hosts 110-1, 110-2 for use in such change/delta comparisons.

In one embodiment, the making of change/delta comparisons is offloaded to each of hosts 110-1, 110-2. That is, rather than having DVSwitch manager poll hosts 110-1, 110-2 and make change/delta comparisons for virtual ports on each of hosts 110-1, 110-2, each of hosts 110-1, 110-2 makes change/delta comparisons for itself based on each of hosts' 110-1, 110-2 own configuration states and the final configuration state received from DVSwitch manager 364. For example, to move DVports from one VLAN to another VLAN, DVSwitch manager 364 may simply push the final DVport assignments to one or more of hosts 110-1, 110-2. Hosts 110-1, 110-2 may then determine what change of port assignments are necessary to update each DVport and associated virtual port of the respective host's 110-1, 110-2 virtual switch.

At step 440, DVSwitch manager 364 monitors for timed-out and failed API invocations, and DVSwitch manager 364 resends configuration transition requests to hosts corresponding to those invocations that timed out or failed. DVSwitch manager 364 may add an entry to re-push queue 366 for every clobber API call that times out or fails. To ensure consistency of DVSwitch configuration state data across DVSwitch server 100 and hosts 110-1, 110-2, DVSwitch manager 364 may monitor re-push queue 366 and resend configuration transition requests to hosts 110-1, 110-2 on which clobber API invocations timed out or failed, because those hosts may have inconsistent DVSwitch configuration state data. Even if those hosts do not have inconsistent DVSwitch configuration state data, the idempotency of clobber API 339, 339' ensures that further clobber API 339, 339' invocations are harmless. DVSwitch manager 364 may also report contents of the re-push queue to a user as out-of-sync information.

Figure 5:
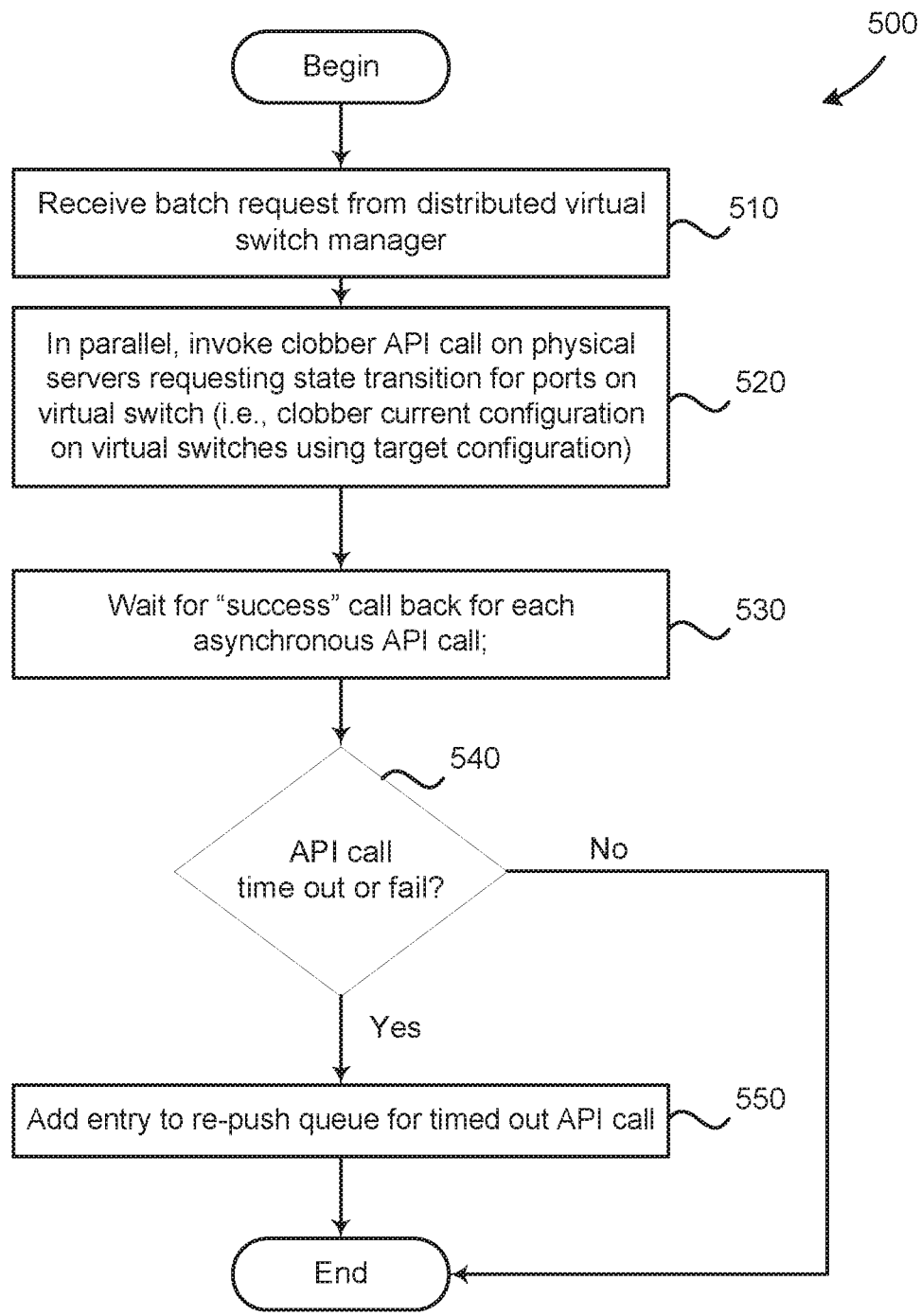
FIG. 5 illustrates a method to handle batch API invocation requests from the DVSwitch management application, according to an embodiment.

FIG. 5 illustrates a method to handle batch API invocation requests from the DVSwitch management application, according to an embodiment. Although the method steps are described in conjunction with FIGS. 1-3, persons skilled in the art will understand that any system configured to perform the method steps, in any order, falls within the scope of the present disclosure.

Method 500 begins at step 510, where network transport component 362 receives a batch "send" request from DVSwitch manager 364. The send request may be an asynchronous I/O request invoked via an API. That is, network transport component 362 may expose an API for sending data via asynchronous I/Os, and DVSwitch manager 364 may invoke this API to, for example, push port state configurations to hosts 110-1, 110-2. Further, network transport component 362 may return control to DVSwitch manager 364 immediately following the send request.

At step 520, network transport component 362 invokes the clobber API on the host servers indicated in the batch request. As discussed above, because the clobber API is asynchronous, network transport component 362 may invoke clobber APIs 339, 339' essentially in parallel.

At step 530, network transport component 362 waits for a callback from the relevant host servers indicating the state transition was completed successfully. For example, clobber APIs 339, 339' may each make a "success" callback to network transport component 362 indicating that state transition was successful. Further, clobber APIs 339, 339' may return an error message in cases where a state transition is unsuccessful. Network transport component 362 may wait for such a "success" return or fail with an error message so that network transport component 362 can then report the results of the batch request to DVSwitch manager 364.

At step 540, network transport component 362 determines whether any clobber API calls made at step 530 have timed out or failed. A time out or failed of a clobber API 339, 339' call indicates that the DVSwitch configuration state data of a corresponding host server 110-1, 110-2 was not updated. In such cases, a re-push of the DVSwitch configuration state may be necessary to ensure data consistency between DVSwitch server 100 and the host server on which clobber API 339, 339' timed out or failed. At step 550, DVSwitch manager 364, which waits for notification from the network transport component 362 of the completion of invocation, adds an entry to a "re-push" queue for each timed-out/failed API call identified by network transport component 362 at step 540 to indicate that a re-push of the unsuccessfully pushed DVSwitch configuration state data is necessary.

In one embodiment, DVSwitch server maintains a re-push queue for each host server spanned by the DVSwitch (i.e., one queue per physical host server), and the DVSwitch manager 364 adds an entry to the appropriate re-push queue when a corresponding clobber API invocation times out or fails. For example, network transport component 362 may add a reference to a configuration state which was not successfully pushed to a host to a corresponding re-push queue for that host. In another embodiment, DVSwitch manager 364 may periodically resend configuration transition requests based on the entries of re-push queue 366. That is, DVSwitch manager 364 may periodically "re-push" DVSwitch configuration states to host servers when clobber API 339, 339' calls time out or fail.

Figure 6:
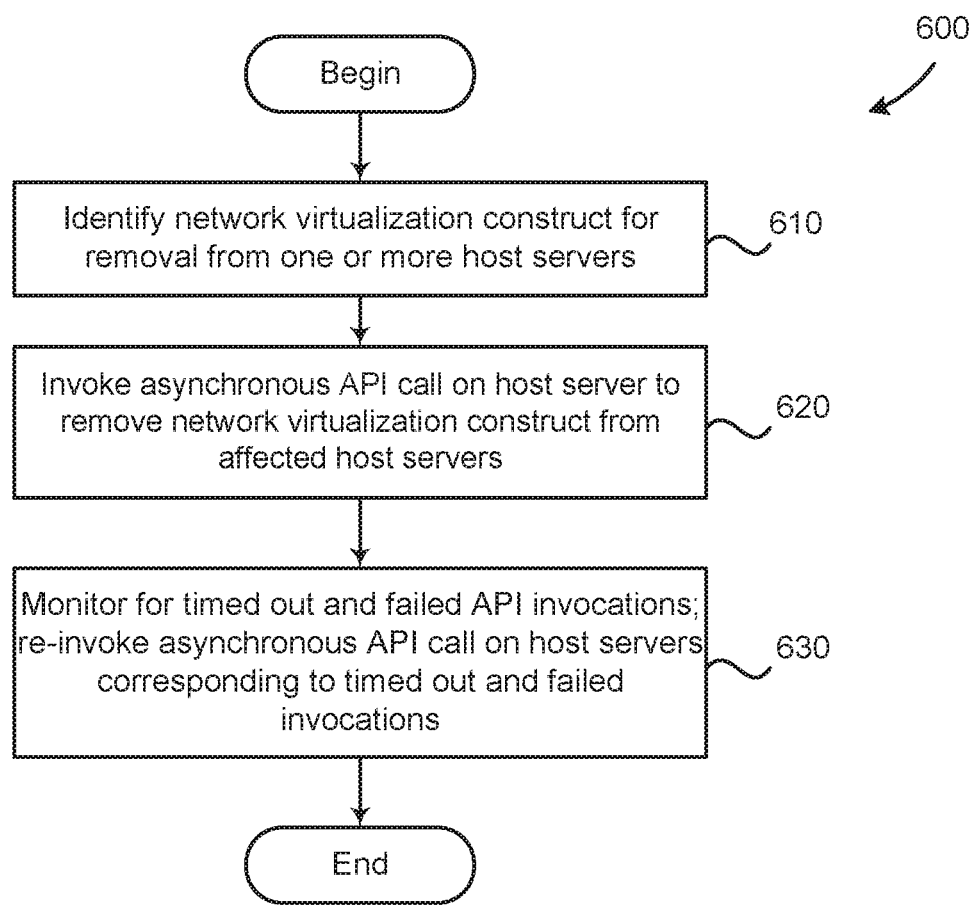
FIG. 6 illustrates a method for removing a network virtualization construct from one or more host servers, according to an embodiment.

FIG. 6 illustrates a method for removing a network virtualization construct from one or more host servers, according to an embodiment. Although the method steps are described in conjunction with FIGS. 1-3, persons skilled in the art will understand that any system configured to perform the method steps, in any order, falls within the scope of the present disclosure.

Method 600 begins at step 610, where DVSwitch manager 364 identifies a network virtualization construct to remove from one or more host servers. For example, where a VM is connected to a virtual port associated with a DVport 336, 337 of DVSwitch 335, the virtualization layer of host 110-1, 110-2 may instantiate and execute both the VM and the virtual port. When the VM is relocated to a second host server, a virtual port may be created on the second host server and associated with DVport 336, 337. After the VM is relocated and associated with the DVport, the virtual port on the original host server is neither connected to the VM nor associated with a DVport. In such a case, DVSwitch manager 364 may identify the virtual port on the original host server as a network virtualization construct for removal (i.e., the object representing the virtual port on the original host server can be deleted).

At step 620, DVSwitch manager 364 invokes an API on the host server to remove the network virtualization construct. In one embodiment, DVSwitch manager 364 may invoke a "remove" API exposed by network transport component 362 for asynchronous I/O, and network transport component may then invoke an API on the host server to actually remove the network virtualization construct. The API on the host server may return indicating the network virtualization construct was successfully removed from the host server. Network transport component 362 may wait for such a return and indicate unsuccessful removal if a success return is not received (e.g., if the invocation times out or fails) to DVSwitch manager 364. Further, DVSwitch manager 364 may add an entry to a rip queue 367 for each unsuccessful invocation.

At step 630, DVSwitch manager 364 monitors rip queue 367 for timed-out or failed API invocations. In one embodiment, DVSwitch manager 364 may periodically examine rip queue 367. For example, DVSwitch manager 364 may examine the rip queue 367 when the DVSwitch manager 364 examines re-push queue 366. For each entry in rip queue 367, DVSwitch manager 364 may further re-invoke an API call on the corresponding host server to remove the network virtualization construct. DVSwitch manager may also report contents of rip queue 367 to a user.

Figure 7A:
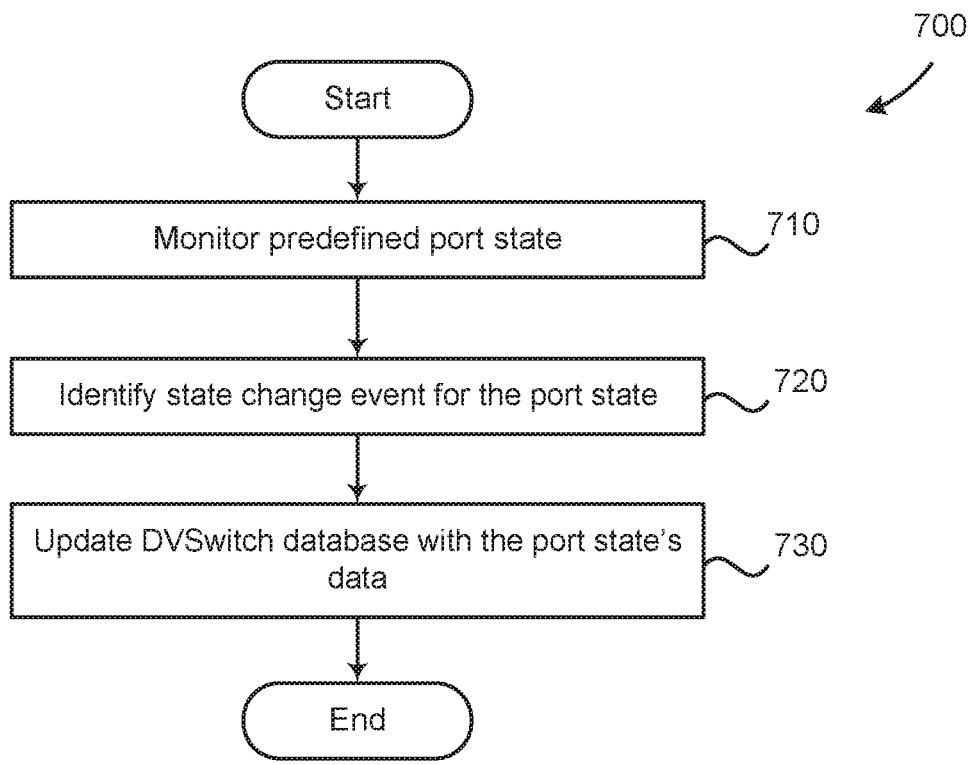
FIG. 7a illustrates a method for pushing port runtime state data to a management server, according to an embodiment.

FIG. 7a illustrates a method for pushing port runtime state data to a management server, according to an embodiment. Although the method steps are described in conjunction with FIG. 1-3, persons skilled in the art will understand that any system configured to perform the method steps, in any order, falls within the scope of the present invention.

Method 700 begins at step 710, where a host server monitors a predefined runtime port state. In one embodiment, the predefined port state is a state change that happens relatively infrequently. For example, port VLAN and mirroring assignments tend to remain stable in large data center environments with many host servers (and corresponding VMs). As a result, DVSwitch manager 364 need not poll host servers' 110-1, 110-2 regarding port VLAN and mirroring assignments, because such polling is often inefficient. The approach of method 700 avoids such inefficient polling by having host server 110-1, 110-2 update DVSwitch manager 364 only when a state change event occurs.

At step 720, host server 110-1, 110-2 identifies a state change event for the predefined port state. In one embodiment, the state change event may be predefined. For example, the host server may determine that a state change made by a user (or by a hypervisor) corresponds to a predefined event upon which updating of DVSwitch manager 364 must be performed.

At step 730, host server 110-1, 110-2 updates DVSwitch manager 364 with the state change. Such an update may be asynchronous, relative to the operation of the DV switch manager 364. In one embodiment, host server 110-1, 110-2 pushes state data to DVSwitch manager 364 via network transport component 362. In such a case, host servers 110-1, 110-2 may utilize network transport component 362 for asynchronous I/O, similar to the asynchronous I/O discussed above with respect to FIG. 5. In another embodiment, host server 110-1, 110-2 may simply notify DVSwitch manager 364 of the port state change event, and DVSwitch manager 364 may then, in its discretion, fetch data associated with the port state from host 110-1, 110-2.

In a further embodiment, DVSwitch manager 364 store updates in database 370 or memory (not shown) of DVSwitch server 100. As discussed above, database 370 stores the runtime state of DVports 336, 337 so that DVSwitch 335 maintains connections between DVports 336, 337 and virtual NICs of VMs even when those VMs are migrated or powered off and on again.

Figure 7B:
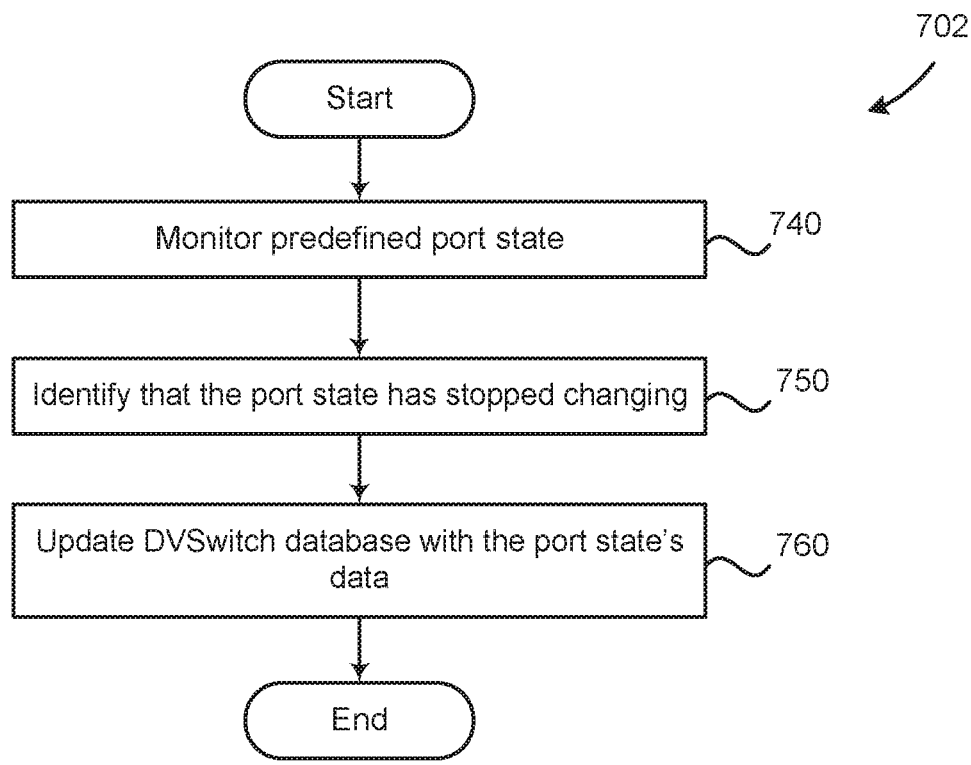
FIG. 7b illustrates another method for pushing port runtime state data to a management server, according to an embodiment.

FIG. 7b illustrates another method for pushing port runtime state data to a management server, according to an embodiment. Although the method steps are described in conjunction with FIG. 1-3, persons skilled in the art will understand that any system configured to perform the method steps, in any order, falls within the scope of the present invention.

Method 702 begins at step 740, where host server 110-1, 110-2 monitors a predefined port state. In one embodiment, the predefined port state is a port state which is identified, either manually by a user or automatically by host servers 110-1, 110-2 or DVSwitch server 100, as changing relatively frequently. For example, counters which measure network performance, such as packet-in and packet-out statistics, change relatively frequently. As a result, DVSwitch manager 364 need not periodically poll host servers' 110-1, 110-2 statistics counters because the cached results of such polling would often be stale anyway. The approach illustrated by method 702 avoids such polling altogether by having host server 110-1, 110-2 update DVSwitch manager 364 only when the predefined port state stops changing.

At step 740, host server 110-1, 110-2 identifies that the predefined port state has stopped changing. For example, host server 110-1, 110-2 may determine that a virtual port to which a DVport is associated has a state of "linked down." This state refers to a release of virtual port resources, by a virtual NIC. This may occur, for example, when a VM associated with the virtual NIC is powered off. After linking down, all I/O and other activity on the virtual port is quiesced, and as a result statistics counters, for example, stop changing.

At step 750, host server 110-1, 110-2 updates DVSwitch manager 364 with data for the port state. Such an update may be asynchronous. In one embodiment, host server 110-1, 110-2 pushes state data to DVSwitch manager 364 via network transport component 362. In such a case, network transport component 362 may support asynchronous I/O by the host server, similar to the asynchronous I/O discussed above with respect to FIG. 5. In another embodiment, host server 110-1, 110-2 may simply notify DVSwitch manager 364 that the predefined port state has stopped changing, and DVSwitch manager 364 may then, in its discretion, fetch data associated with the port state from host 110-1, 110-2.

In one embodiment, DVSwitch manager 364 may cause received state data updates to be stored in database 370 or memory (not shown) of DVSwitch server 100. State data stored in database 370 or memory may then be displayed to a user for various purposes, including debugging of the network.

In a further embodiment, the user may further fetch real-time port runtime state data via a pass-through API exposed by DVSwitch manager 364. The pass-through API may be configured to invoke an API exposed by host servers 110-1, 110-2 for retrieving real-time runtime state data. In such a case, the user may have access to real-time runtime state data even though state data is otherwise updated to DVSwitch manager 364 only when the state stops changing. For example, the user may invoke the pass-through API to fetch real-time statistics counter data for a DVport even when the virtual port associated with that DVport is linked up to a virtual NIC (and thus the statistics counter is frequently changing). The method 702 ends thereafter.

Embodiments disclosed herein provide a technique for pushing configuration changes to the configuration of a distributed virtual switch to a plurality of host servers. The distributed virtual switch provides a software abstraction of a physical switch with a plurality of distributed virtual ports that correspond to virtual port of virtual switches on the plurality of host servers. The approach includes invoking, by an application of the management server, application programming interfaces (APIs) exposed by each of the plurality of host servers. Each API invocation requests a state transition to a final configuration state. The approach further includes determining, by each API, port state configuration changes required for virtual ports emulated via a virtualization layer of the respective host server to achieve the final configuration state. Each of the host servers then performs the required changes for virtual ports on the respective host server.

In a further embodiment, host servers push port runtime state data for distributed virtual ports of a distributed virtual switch to a management server by monitoring a predefined port state, identifying a state change event for the port state, and updating the management server with data for the port state. In such a case, the predefined port state may be a port state which is determined to change infrequently. Conversely, for a predefined port state which frequently changes, the host servers may push port runtime state data for distributed virtual ports of a distributed virtual switch from a host server to a management server by monitoring a predefined port state, identifying that the port state has stopped changing, and updating the management server with data for the port state.

Advantageously, embodiments described herein distribute data processing across host servers and reduce network congestion. To ensure consistency of port state configuration data across a distributed virtual switch, a management server may invoke a clobber API, which accomplishes state change in an idempotent manner from the perspective of the management server. That is, rather than determining and sending the change/delta needed for each port to attain the new configuration, management server simply sends a desired final state to the host servers via clobber API, and the host servers independently determine and make any necessary port state changes. Further, to update the management server on runtime state data of ports of the distributed virtual switch, each host may either only send state data when the runtime state changes or only send state data when the runtime state stops changing. This approach eliminates the need for management server to periodically poll each host and to store cached copies of each hosts' runtime state data.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that VMs present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for updating a management server with runtime state data of a virtual port of a virtual switch, wherein the virtual port is emulated via a virtualization layer of a host server of a plurality of host servers, and further wherein the virtual port is connected to a virtual machine running on the host server, the method comprising:
    monitoring, by the host server, a first port state and a second port state of the virtual port, wherein the first port state changes less frequently than the second port state changes; and
    in response to detecting a change in the first port state, transmitting data for the first port state to the management server; and
    in response to detecting that the second port state has stopped changing, transmitting data for the second port state to the management server, wherein the detecting that the second port state has stopped changing includes determining that the virtual port is in a linked down state.

2. The method of claim 1, wherein the transmitting data for the first port state occurs in response to identifying a predefined state change event for the monitored first port state.

3. The method of claim 2, wherein the first port state is one of a virtual local area network (VLAN) or a mirroring assignment.

4. The method of claim 1, wherein the transmitting data for the second port state occurs in response to identifying that the second port state has stopped changing.

5. The method of claim 4, wherein the second port state is a counter that measures network performance.

6. The method of claim 1, wherein the data for the first port state is transmitted to the management server via a network transport component that supports asynchronous input/output (I/O).

7. The method of claim 1, wherein the management server fetches the data for (a) the first port state in response to a notification provided upon identification of a predefined state change event or (b) the second port state in response to a notification provided upon identification that the second port state has slopped changing.

8. The method of claim 1, wherein
    the virtual switch is a distributed virtual switch that includes components on the plurality of host servers in communication with the management server; and
    monitoring of port states and transmitting of port state data are performed by each of the plurality of host servers for corresponding virtual ports.

9. A non-transitory computer readable storage medium comprising instructions configured for updating a management server with runtime state data of a virtual port of a virtual switch, wherein the virtual port is emulated via a virtualization layer of a host server of a plurality of host servers, and further wherein the virtual port is connected to a virtual machine running on the host server, the instructions further configured for:
    monitoring, by the host server, a first port state and a second port state of the virtual port, wherein the first port state changes less frequently than the second port state changes; and
    in response to detecting a change in the first port state, transmitting data for the first port state to the management server; and
    in response to detecting that the second port state has stopped changing, transmitting data for the second port state to the management server, wherein the detecting that the second port state has stopped changing includes determining that the virtual port is in a linked down state.

10. The non-transitory computer readable storage medium of claim 9, wherein the transmitting data for the first port state occurs in response to identifying a predefined state change event for the monitored first port state.

11. The non-transitory computer readable storage medium of claim 10, wherein the first port state is one of a virtual local area network (VLAN) or a mirroring assignment.

12. The non-transitory computer readable storage medium of claim 9, wherein the transmitting data for the second port state occurs in response to identifying that the second port state has stopped changing.

13. The non-transitory computer readable storage medium of claim 12, wherein the second port state is a counter that measures network performance.

14. The non-transitory computer readable storage medium of claim 9, wherein updating the management server includes pushing port state data to the management server via a network transport component that supports asynchronous input/output (I/O).

15. The non-transitory computer readable storage medium of claim 9, wherein the management server fetches the data for (a) the first port state in response to a notification provided upon identification of a predefined state change event or (b) the second port state in response to a notification provided upon identification that the second port state has stopped changing.

16. The non-transitory computer readable storage medium of claim 9, wherein:
    the virtual switch is a distributed virtual switch that includes components on the plurality of host servers in communication with the management server; and
    monitoring of port states and transmitting of port state data are performed by each of the plurality of host servers for corresponding virtual ports.

17. A system, comprising:
    a processor; and
    a memory storing one or more applications, which, when executed on the processor, perform operations for updating a management server with runtime state data of a virtual port of a virtual switch, wherein the virtual port is emulated via a virtualization layer of a host server of a plurality of host servers, and further wherein the virtual port is connected to a virtual machine running on the host server, the operations comprising:
        monitoring, by the host server, a first port state and a second port state of the virtual port, wherein the first port state changes less frequently than the second port state changes; and
        in response to detecting a change in the first port state, transmitting data for the first port state to the management server; and
        in response to detecting that the second port state has stopped changing, transmitting data for the second port state to the management server, wherein the detecting that the second port state has stopped changing includes determining that the virtual port is in a linked down state.

18. The system of claim 17, wherein either:
    the first port state is one of a virtual local area network (VLAN) or a mirroring assignment and the transmitting data for the second port state occurs in response to identifying a predefined state change event for the first port state, or the second port state is a counter that measures network performance and the transmitting occurs in response to identifying that the second port state has stopped changing.

19. The method of claim 1, further comprising:

monitoring, by a second host server, a second port state of a second virtual port that is emulated via a second virtualization layer of the second host server; and transmitting data for the monitored second port state of the second virtual port to the management server.

20. The method of claim 1, wherein:

data for the first port state is transmitted to the management server in response to detecting the change in the first port state instead of in response to detecting that the first port state has stopped changing, based on the first port state changing less frequently than the second port state changes; and data for the second port state is transmitted to the management server in response to detecting that the second port state has stopped changing instead of in response to detecting a change in the second port state, based on the first port state changing less frequently than the second port state changes.

\* \* \* \* \*